United States Patent [19]

Lakatos

[11] Patent Number: 5,502,555
[45] Date of Patent: Mar. 26, 1996

[54] PRINTING SYSTEM HAVING AN IMAGE CHARACTERISTICS AUTOMATIC METHOD AND APPARATUS FOR COPY SHEET RESELECTION

[75] Inventor: Andras I. Lakatos, Penfield, N.Y.

[73] Assignee: Xerox Corporation, Stamford, Conn.

[21] Appl. No.: 273,386

[22] Filed: Jul. 11, 1994

[51] Int. Cl.⁶ .................................................. G03G 21/00
[52] U.S. Cl. ......................... 355/311; 271/9.01; 271/9.05
[58] Field of Search .................................. 355/308, 309, 355/311, 319; 271/9, 9.01, 9.05

[56] References Cited

U.S. PATENT DOCUMENTS

| | | | |
|---|---|---|---|
| 4,336,994 | 6/1982 | Banton | 355/4 |
| 4,478,910 | 10/1984 | Oshima et al. | 428/331 |
| 4,748,453 | 5/1988 | Lin et al. | 346/1.1 |
| 4,758,461 | 7/1988 | Akiya et al. | 428/212 |
| 4,825,256 | 4/1989 | Nakai et al. | 355/311 X |
| 4,935,788 | 6/1990 | Fantuzzo et al. | 355/326 |
| 5,075,153 | 12/1991 | Malhotra | 428/207 |
| 5,127,643 | 7/1992 | DeSanctis et al. | 271/9 |
| 5,132,786 | 7/1992 | Ishiwata | 358/75 |
| 5,162,853 | 11/1992 | Ito et al. | 355/311 X |
| 5,200,817 | 4/1993 | Birnbaum | 358/80 |
| 5,237,379 | 8/1993 | Sklut et al. | 355/311 |
| 5,245,701 | 9/1993 | Matsumoto | 395/129 |
| 5,281,998 | 1/1994 | Douglas et al. | 355/202 |
| 5,424,821 | 6/1995 | Sampath | 355/311 |

*Primary Examiner*—Fred L. Braun
*Attorney, Agent, or Firm*—Tallam I. Nguti

[57] ABSTRACT

An electronic reprographic machine having an image characteristics method and apparatus for automatic in-process copy sheet supply reselection. The reprographic machine includes simplex and duplex modes, an electronic imaging data processing unit and a plurality of copy sheet supply units holding different types of alternative copy sheets, such as recycled paper sheets, transparencies, coated or plain paper sheets. The reprographic machine also includes programmable controller for detecting the presence or absence of a specified type of imaging data, and for then automatically and responsively selecting a type of copy sheet so as to provide high quality, cost effective copies of multi-page documents.

23 Claims, 3 Drawing Sheets

PRINTING SYSTEM HAVING AN IMAGE CHARACTERISTICS AUTOMATIC METHOD AND APPARATUS FOR COPY SHEET RESELECTION

BACKGROUND OF THE INVENTION

The present invention relates to reprographic or printing systems for producing copies of images on various types of suitable image receiving sheets. More particularly, the present invention relates to an electronic reprographic or printing system having multiple supplies of suitable types of image receiving sheets, and an automatic in-process sheet supply reselection feature.

Reprographic systems which include electronic printers such as electrostatographic laser printers, ink jet printers, thermal printers and other like electronic printers are well known for producing copies of images of documents on various types of suitable image receiving members, such as on copy sheets. In general, each of these types of printers includes a means for capturing images of the document or a means for receiving already captured information of images of a document. In addition, each of these types of printers includes an output portion that has toners or inks for rendering the captured image visible on a suitable image receiving member, such as on a copy sheet.

For example, a dry toner electrostatographic laser printer is disclosed in U.S. Pat. No. 4,336,994 and includes a raster input scanner (RIS) device for electronically capturing images by scanning. When scanning a multicolor original image, the RIS produces digitized video signals corresponding to color separated images of the original image. The disclosed laser printer also includes a raster output scanner (ROS) device for writing the electronically captured image on a charged photoreceptor, and dry toners for developing such latent images. Similarly, U.S. Pat. No. 4,922,298 discloses a dry toner electrostatographic printer having an input scanning system for scanning an original document having at least two discrete colored areas. Output signals are produced by the scanning system corresponding to detected colored areas of the original. The signals are sent to a controller which determines the detected color image coordinates for each area of an output copy to be made.

U.S. Pat. No. 4,935,788, on the other hand, discloses an example of a liquid toner laser electrostatographic printing system for producing multicolor images. The system includes image capture means, and a plurality of raster output scanner (ROS) devices for each imagewise writing a corresponding plurality of color separation latent images on a charged moving photoreceptor. The latent images are developed using liquid toners, and are then transferred in superimposed registration with one another onto an intermediate member for subsequent transfer onto a copy sheet.

A color ink jet printing apparatus, for example, is disclosed in U.S. Pat. No. 4,748,453 and includes a black ink printhead, as well as additional printheads. The additional printheads contain different color inks for use with the black ink for printing a multicolor image on a supported image receiving sheet.

The above example types of reprographics printers or machines ordinarily use plain, bond type paper copy sheets when producing images in black ink. However, as disclosed, for example, in U.S. Pat. Nos. 4,478,910; 4,758,461; and 5,075,153, color images preferably should be printed on coated paper. Accordingly, in U.S. Pat. No. 4,478,910 a multi-layered coated paper including fine silica particles is disclosed for use in printing multicolor images. U.S. Pat. No. 4,758,461 discloses for this same purpose, a similar type coated paper that includes a silica containing pigment on its surface, and U.S. Pat. No. 5,075,153 discloses a coated paper containing a plastic substrate. Coated papers as such are ordinarily specially made papers, and are, therefore, relatively more expensive than plain paper. It would therefore represent a significant cost savings if when reproducing a document having single color image pages and multicolored image pages, to use such expensive coated paper only for the multicolored image pages. Copy sheets besides being plain or coated papers, can preferably also be transparency substrates or recycled paper, as opposed to virgin paper. As is well known, each of these types of copy sheets can furthermore have a different surface finish, for example, a matte or glossy finish. Since transparency sheets, virgin paper sheets, and glossy finish sheets are also relatively more expensive than plain or recycled paper sheets, it would similarly amount to a significant cost savings if they are used preferably and primarily only for multicolored image pages.

To achieve such cost savings in reprographic machines, a selection of the appropriate types of color sheets would have to be available to the machine. As is well known, reprographic machines can, of course, each be provided with a plurality of copy sheet supply units, each of which is capable of holding and feeding a different size as well as a different type of copy sheet. In such a machine, however, a copy sheet supply unit for printing a document is ordinarily selected manually by an operator, or it is preprogrammed for automatic selection based on some characteristic of the document sheet. In U.S. Pat. No. 5,127,643, for example, a reprographic machine is disclosed and includes an automatic copy sheet supply selection device. The device includes a document sheet weight sensor, and a preprogrammed controller for automatically choosing the proper type of copy sheet from one of several supplies based on the weight of the document sheet. In U.S. Pat. No. 5,237,379, a similar machine is disclosed and includes means for automatic copy sheet size selection. The method of the machine includes sensing the size of the document sheet and selecting a copy sheet supply by comparing the sensed document size with a set of prestored corresponding copy sheet sizes.

In producing copies of single and multicolor images on suitable image receiving members or copy sheets, it is now known to provide such reprographic machines with means for detecting, interpreting, and manipulating digitized image data. For example, in U.S. Pat. No. 5,200,817 a color reprographic system is disclosed that includes means for detecting raw RGB (red, green, blue) color image data, and for converting such data into a colorimetric system such as CIELAB or CIELUV. In U.S. Pat. No. 5,132,786 a color converting system for reprographic machines is disclosed. The system includes a color detecting means, and comparison means for judging whether the color of the input image data is within a preset comparison color range. In U.S. Pat. No. 5,245,701 an image processing system and method are disclosed for efficient storage of image data having different numbers of bits per pixel. The method includes a step of calculating for each line of pixels to be stored, a least common multiple (LCM) of the number of bits of the pixels of the image data. In U.S. Pat. No. 5,281,998, a system is disclosed for producing images in optional colors. The system includes means for identifying elements of images (pixels) with color code marks, and for then responsively altering the color of the pixel to an optional color.

As is also well known, documents of various sizes including those containing a large number of pages can be reproduced on these machines. Such documents may contain text which is usually in black ink, and they may also contain tables, graphics and pictorial images which can be in different, multicolor inks. In addition, the document may be supplied for printing in a simplex or duplex form. As such, a cost efficient and high quality way of reproducing such a document would be to have black text-only pages printed on plain bond or recycled copy paper, and color as well as multicolor images printed on specialty sheets, such as on glossy paper or coated paper sheets. For very large documents, preprogramming machine changes for each of such page-to-page options is clearly a problem for an operator. In addition, the average operator making a copy of the document may not know what to preprogram in order to obtain a cost effective quality reproduction of the document.

SUMMARY OF THE INVENTION

In accordance with one aspect of the present invention, there is provided an in-process control method for automatically controlling an at least two-states aspect of a computer controlled printing machine that receives and processes imaging data for producing copies of an image in segments. The method includes the steps of reading a prestored identifier for a type of image data item to be used as a basis for controlling the aspect of the machine, and of determining whether image data items received and processed for printing each segment of the image include data items of the type identified by the identifier. More importantly, the method includes the step of automatically controlling, in response to a result of the determining step, the aspect of the machine to one of the at least two states of the aspect.

In accordance with another aspect of the present invention, there is provided an electronic reprographic or printing machine that includes a controllable aspect having at least two states. The reprographic machine also includes an electronic control subsystem and an image output unit for outputting an image, in segments, onto a copy sheet. The electronic control subsystem includes data storage means, and a unit for receiving electronic imaging data items comprising image data items, and control data items including start-of a segment, and end-of the segment control items. The electronic control subsystem also includes a unit for reading a prestored identifier of a type of image data items to be used as a basis for controlling to one of the at least two states, the controllable aspect during printing of each segment. A comparison unit is also included for obtaining a result from comparing with the prestored identifier, types of image data items received between detection of a start-of a segment control data item, and of an end of the segment control data item. The electronic control subsystem further includes a unit for automatically selecting, responsively to the result of the comparison unit, one of the two states of the controllable aspect.

Other features of the present invention will become apparent from the following drawings and description.

BRIEF DESCRIPTION OF THE DRAWINGS

For a better understanding of the present invention, reference may be had to the accompanying drawings wherein the same reference numerals are applied to like parts, and in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
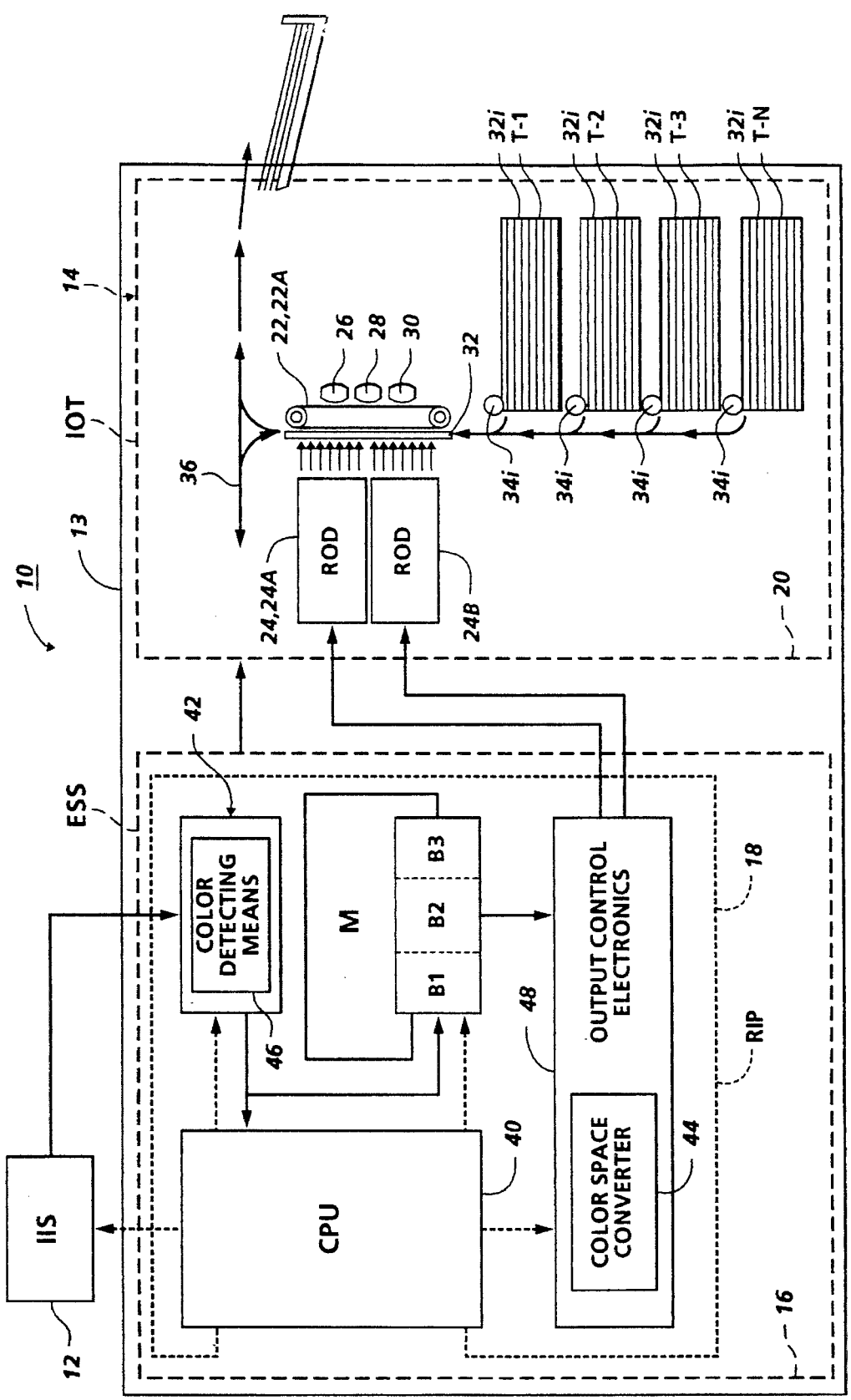
FIG. 1 is a block diagram of an electronic document processing system including the reprographic machine of the present invention.

Referring now to FIG. 1, an electronic document processing system 10 is shown including an image input source IIS 12, and an exemplary electronic imaging or reprographic machine 13 of the present invention. As shown, the reprographic machine 13 includes an image output terminal (IOT) 14, and an electronic control subsystem 16. As such, the reprographic machine 13 is capable of receiving electronic image data of an original image from the IIS 12, processing such image data, and controllably reproducing copies of the original image on a suitable image receiving member or sheet.

The image input source (IIS) 12, for example, may be an input scanning assembly, as are well known. Such an assembly typically includes a transparent platen (not shown) for holding a document, light sources (not shown) for illuminating images of the document, and a page-width photo-diode array or CCD array raster input scanner (RIS) (not shown) for scanning the illuminated images, picture element (pixel) by picture element (pixel). During such input scanning, analog signals from each such array are converted by an analog/digital converter into digital video signals for each pixel (picture element). When the scanned image is a multicolor image, the digital signals, as is well known, represent the red, green, and blue separations of the scanned image. The electronic video signals generated by the RIS, as shown, are provided to the electronic control subsystem ESS 16 for processing.

Alternatively too, the image input source IIS 12 can be a computer workstation connected directly or via a computer server to the reprographic machine 13. Typically, such a computer workstation is equipped with document applications software for creating, editing and storing softcopy electronic soft images of documents. A user of such a workstation can subsequently generate "hardcopy" reproductions of created softcopy images by instructing the workstation to provide the processed electronic image to a selected printing device such as the electronic reprographic machine 13 of the present invention. Electronic images generated by such a workstation or by a raster input scanner (RIS) consists of a two dimensional array of picture elements (pixels). For color images, the color of each pixel may be encoded in any of a variety of color notations or color spaces such as the additive red, green and blue (RGB) phosphor color space.

Electronic images of a document captured or generated as above, are typically encoded using a page description language or (PDL) such as Interpress™, as disclosed in "Interpress™: The Source Book", Simon & Schuster, Inc., New York, N.Y., 1988, by Harrington and Buckley. Other examples of PDLs are Postscript® ("PS") which is described in "PostScript® Language Reference Manual", Second Edition, Addison-Wesley Publishing Co., 1990, and Hewlett Packard Printer Control Language ("HP-PCL") which is described in "PCL 5 Printer Language Technical Reference Manual", First Edition, Hewlett Packard Co., 1990. In general, a PDL can encode such an electronic image by providing a set of commands that are used to describe various graphic and textual elements forming the image to be printed. For example, a PDL can describe a rectangle in an image by indicating coordinates of its corners, the thickness of its edges, its fill pattern, and very importantly its color. PDLs or page description languages thus can specify, or provide instructions for, the printing of the images of a document, pixel by pixel, and a page at a time. For specifying a character to be printed, a PDL can do so in terms of font type, size, position on the page, and the color or colors of inks in which the character is to be printed.

According to the present invention, electronic imaging data generated according to a PDL and coming from the IIS 12 would therefore include image data which specifies the image, and control data which can be processed to determine how, when and where, for example, each spot or pixel of the image will be printed. In each case, however, images of a document, including, for example, single color and multicolor images, can be captured or created in accordance with a page description language (PDL) application software, and then transmitted or stored for subsequent communication, by the IIS 12 to the reprographic machine 13.

Still referring to FIG. 1, the electronic imaging data captured or created by the IIS 12 is transmitted, as shown, to the ESS 16 of the electronic reprographic machine 13. As further shown, the imaging data is received by the ESS 16, and is processed, for example, by a raster image processing (RIP) unit 18 of ESS 16. The processed data is then forwarded for printing by the image output terminal (IOT) 14. The IOT 14, for example, can be an electrostatographic laser printer that includes a frame 20, a chargeable photoconductive imaging member 22, and a raster output device scanner (ROD) 24. The ROD 24 which in a laser printer includes a laser unit (not shown) receives the processed imaging data from ESS 16 for outputting or writing latent images on the charged photoconductive imaging member 22. The laser unit of ROD 24 which typically has a rotating polygon mirror for focusing an imaging beam, writes on the imaging member 22, by laying out a latent image, pixel by pixel, and in accordance with processed imaging data. The latent image is layed out as such in a series of horizontal scan lines, and each scan line has a specified resolution or number of pixels per inch. The latent image layed out on the photoconductive imaging member 22 is then developed or made visible, for example, by developer units 26, 28 and 30 using dry or liquid toners. The dry or liquid toners can, for example, be black, yellow, red, green or blue when performing highlight color imaging, or they can be black, cyan, magenta and yellow for forming single color toner images and multicolor toner images. The toner images so formed can then be transferred to an image receiving member or copy sheet.

As another example, the IOT 14, can be a dot or spot printer with a raster output printhead 24A. The spot printer, for example, can be a thermal printer, or an ink jet printer that includes printheads 24A, and 24B, and means 22A for supporting an image receiving member or copy sheet 32 in relative motion with the printheads 24A, 24B. In an ink jet printer, the printheads 24A, 24B ordinarily each include sets of nozzles or ejectors that can be isolatably supplied with different colors of liquid ink. The printheads also each include electronic driver circuitry for selectively activating each ejector to output a drop of ink for printing a spot or pixel in accordance to output imaging data from ESS 16. The different color inks of an ink jet printhead, for example, can be black, yellow, red, green or blue for highlight color printing, or black, cyan, magenta and yellow for single and multicolor image printing.

More importantly, according to the present invention, the IOT 14 whether an electrostatographic laser printer, or a raster spot printer, includes a plurality of copy sheet supply units shown as T-1, T-2, T-3 to T-N, for example, for holding a desirable variety of alternative copy sheet types shown generally as 32$i$. Alternative copy sheet types, for example, may include coated and uncoated paper sheets, virgin and recycled paper sheets, matte finish and glossy finish sheets, and paper and transparency sheets. Each copy sheet supply unit T-1, T-23, T-3 and T-4 includes a drive means shown generally as 34$i$, that is identifiable by, and controllably interfaced with ESS 16 for selectively supplying a desired alternative type copy sheet to receive the toner or liquid ink images formed as above. According to the present invention, the copy sheet supply units are loaded and identified in accordance with at least one alternative set of types of copy sheets as listed above. As shown, the IOT 14 preferably also includes copy sheet recycling means 36, and attendant controls, for transferring the toner images, or printing the liquid ink images, in a simplex mode (single sided) or in a duplex mode (two sided), on a supplied copy sheet.

As such, the IOT 14 has at least a couple of controllable aspects, namely: selection of an alternative copy sheet type, and selection of a per sheet imaging mode. As described above, each aspect, for example, has at least two states. For the per sheet imaging mode, the selectable states are simplex mode or duplex mode, and for the alternative copy sheet type selection, the states or values, for example, can be paper or transparency sheets; matte or glossy finish sheets; recycled or virgin paper sheets; and plain or coated paper sheets. A selected state or value therefore can be effected by activating the duplex sheet recycling handling means 36, or by activating the individual drive means 34$i$ of a selected copy sheet supply unit.

Figure 2:
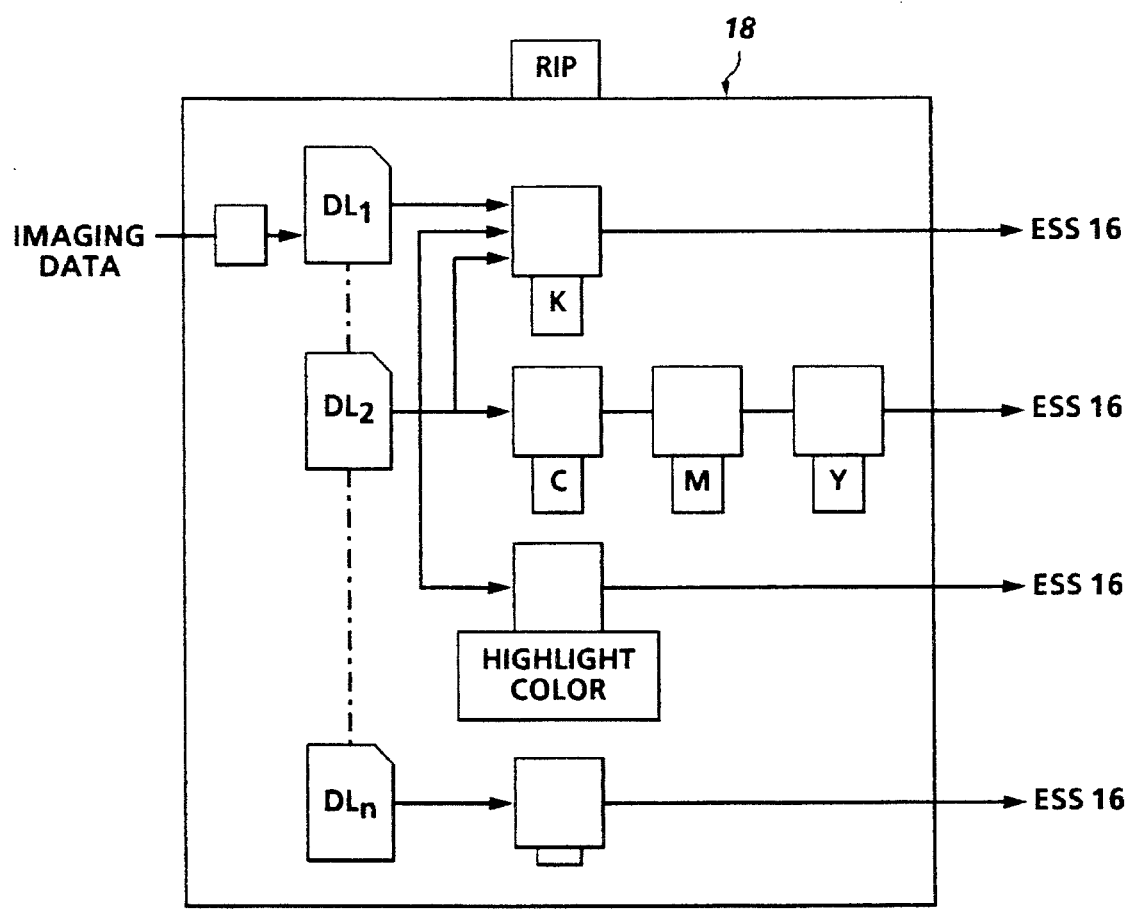
FIG. 2 is a block diagram illustration of the image processor of the electronic subsystem of the reprographic machine of FIG. 1.

Referring now to FIGS. 1 and 2, the electronic subsystem, ESS 16 for processing the imaging data, and for controlling the operations and functions of the various subsystems of the reprographic machine 13, is shown. As illustrated, ESS 16 includes at least one, and may be several programmable microprocessors (CPU) 40 for handling all the image data, and control data, some of which may be signals from condition sensors of the various controllable aspects of the machine 13. ESS 16, therefore, is adapted to control the drive means 34$i$ of each copy sheet supply unit for selectively supplying selected types of copy sheets from the supply units T-1, T-2, T-3 . . . T-N. Similarly, ESS 16 is to control the various means, for example the means 36, for effecting copy sheet recycling and duplex printing, when the IOT 14 is set or reset to the duplex mode.

As further illustrated, ESS 16 includes the raster image processor (RIP) 18. RIP 18, as shown, includes an image data input controller 42 for receiving a stream of PDL encoded imaging data from the IIS 12, and a programmable microprocessor, for example, CPU 40 for processing such imaging data. As pointed out above, such imaging data or data items include image data items, and control data items. The imaging data items are encoded, for example, as to whether they are image data items or control data items. The image data items are further encoded, for example, by an attached color descriptor describing the color content of each image data item. Upon receiving a stream of PDL encoded imaging data, RIP 18 parses or analyses and breaks down such imaging data into various easily processed components that may be further processed before output to IOT 14.

Ordinarily, the encoded color content of an imaging data item is received by RIP 18 in terms of red, green and blue (RGB) color space codes, and is then processed and converted, for example, by a color space converter unit 44 of RIP 18, using a color look up table. RIP 18 for such conversions typically contains predetermined transform definitions in the look up table (LUT) for converting an image defined in one color space to another color space. The look up table (LUT), thus enables image data in a given color space to be readily mapped from that color space to another. Accordingly, the color of each pixel of an electronic image being processed by RIP 18 is sequentially mapped using a LUT transform definition, for transfer to the IOT 14, and in terms of a color space reproducable by the IOT 14. For example, red, green and blue imaging data received from the IIS 12 can be processed and converted into a black, cyan, magenta and yellow color space codes, suitable for outputting by the IOT 14.

RIP 18 as shown therefore includes color interpreting or detecting means 46 for detecting the color content of each image data item received, or of each color ink mixing instruction data item. Instruction data items are for instructing the output control electronic portion 48 of ESS 16 or of the IOT 14, as to the output ink of such item. Within the RIP 18, the stream of imaging data being received and identified or interpreted, is typically translated into bitmaps, which for multicolor images represent the color separation components for each pixel, or data item. The processed data then may be compressed and stored in page size memory buffers shown as M, and as B1, B2 and B3 which are for storing color separation component image data for a multicolor image being processed. The stored, color converted, data may then be retrieved, decompressed and forwarded to the IOT 14 via the output control electronics 48 as black, cyan, magenta and yellow color content data. In being passed through the RIP 18, the image data is maintained or segmented into scan lines each having a start-of-segment signal, and an end-of-segment signal, for example, each page has a start-of-page signal and an end-of-page signal.

Accordingly, as illustrated in FIG. 2, a multi-page PDL encoded electronic color document, for example, can be decomposed within the RIP 18 into lists of a variety of data item types, including lists such as $DL_1$, $DL_2$ ... $DL_n$ representing the various types of output color content of the items of the imaging data stream. Each such list $DL_1$, $DL_2$ ... $DL_n$ is maintained or created according to the segmentations of the documents, such as on a page-by-page basis. In some cases, only a single color content list e.g. $DL_i$ may be created for a page from a pages' worth of received imaging data items. In such a case, it means that all the image data items to be printed on that page are to be printed in a single color ink, for example, ink K (black). In other cases, a plural number of such lists may be generated for a single page to be printed. The plural lists, for example, may include $DL_1$ and $DL_2$ meaning that some or all of the image data items to be printed on the page will include a highlight color, or process colors of cyan, magenta, and yellow.

In accordance with the present invention, the microprocessor 40 is programmable to store, read and use various identifiers of each of the color content type lists $DL_1$, $DL_2$ ... $DL_n$ as a basis for effectively controlling aspects of the reprographic machine 13. The microprocessor 40 is additionally programmable along steps (described below) for identifying the color content of image data items (the list $DL_i$) processed from imaging data items received between a start-of-a page control and end-of-the page control. The CPU 40 is further programmed for comparing the color content type of such received data items with that of the prestored identifier that is being used as a basis for controlling an aspect of the machine 13. The result of the comparison as programmed should be either a correspondence or lack of such correspondence between the identifier and the color content of received data items for a page to be printed. According to the present invention, the ESS 16 is further programmed to automatically and responsively select one or the other of the states of copying mode, or one or the other of an alternative set of types of copy sheets for supply to the IOT 14, depending on the result of such a comparison.

For example, in order to consistently produce high quality documents in a cost effective manner, the microprocessor 40 according to the present invention is programmed to compare the color content of image data items received between a pair of page controls, with a prestored identifier for multicolored image data items. A non-zero signal from such a comparison would indicate the presence of the identifier type data items in the received and processed data, and a zero signal would indicate the absence of such data items. Such absence, on the other hand, would indicate the presence of only a single color (ordinarily black) image type data items. The ESS 16 as programmed according to the present invention, then automatically and responsively selects coated paper sheets from a coated paper sheet supply unit, when the result of the comparison is a non-zero signal indicating the presence of multicolor image data items to be printed on the page. For this same result of the comparison, the ESS 16 can also be programmed to select a sheet supply unit supplying glossy finish paper sheets, or transparencies. In addition, in response to a non-zero signal indicating the presence of multicolor image items to be printed on a page, the ESS 16 is also programmed to switch from a duplex mode to a simplex mode in order to print such a page in simplex mode. Such in-process switching produces high quality color images that would otherwise be degraded if printed in a duplex manner.

However, when the result of the comparison is a zero signal indicating the absence of multicolor image data items and the presence instead of a single color image data items, the ESS 16 according to the present invention is programmed to automatically and responsively select plain paper sheets from a plain paper sheet supply unit. For this latter result of the comparison, the ESS 16 can also be programmed to select a copy sheet supply unit supplying matte finish paper sheets, or recycled paper sheets.

Figure 3:
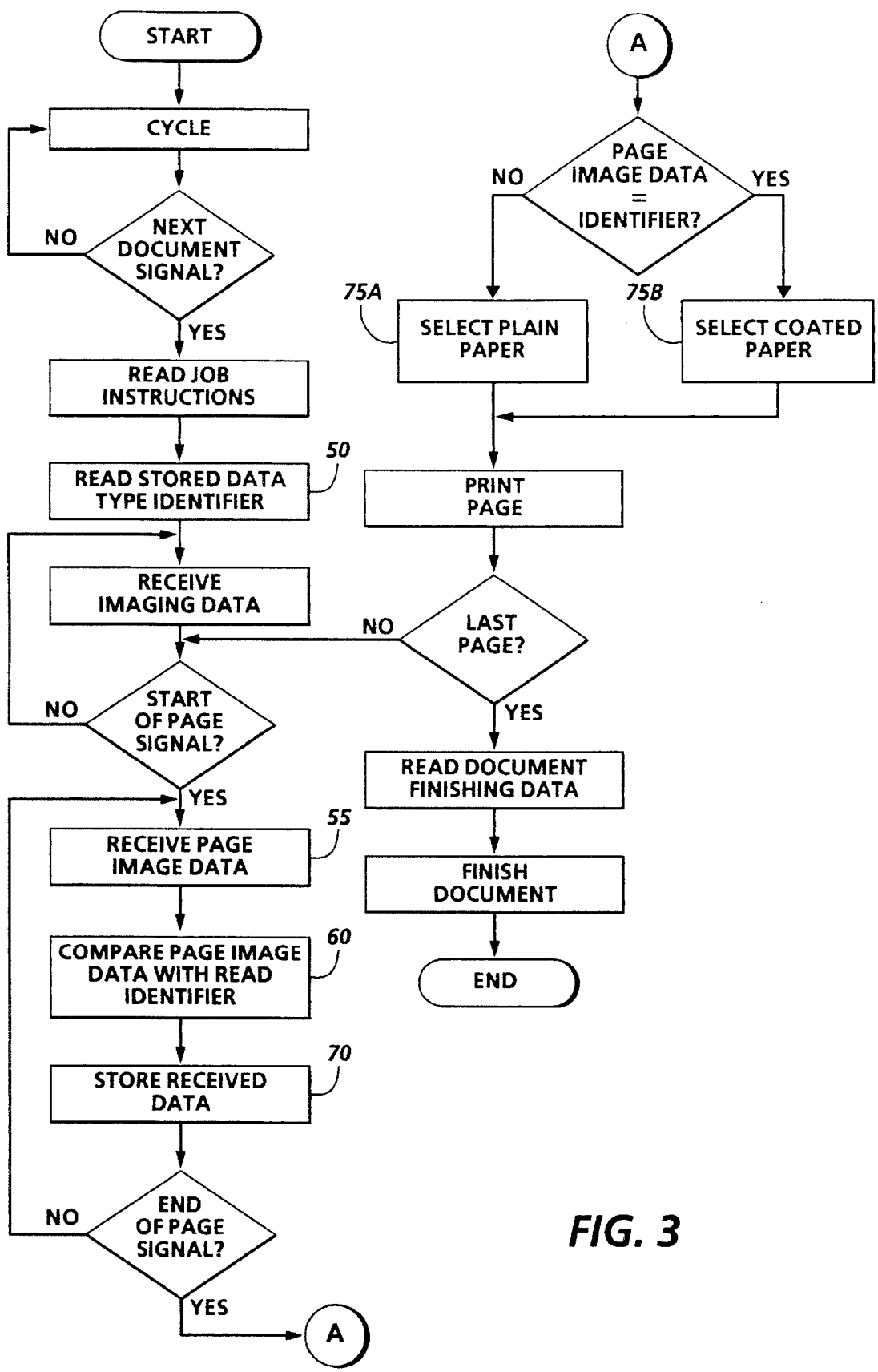
FIG. 3 is a flow chart illustrating the automatic in-process copy sheet supply unit reselection method of the present invention.

Referring now to FIG. 3, a flow chart of the method of the present invention is illustrated. Principally, the method includes the step 50 of reading a prestored identifier of a type of image data items, such as an identifier of the color content type of image data items of the type being received and processed. The presence or absence of such identifier type image data items is to be used as a basis for controlling the page-by-page selection of a copy sheet supply unit, or of the copying mode. The method also includes the step 55 of receiving electronic imaging data items from the image input source IIS 12 for processing by the RIP 18. Such imaging data items, for example, are created and encoded according to a PDL, and thus include control data items, and image specifying data items. The control data items, for example, include for each page, a start-of-the page control signal data, and end-of-the page control signal data. The method next includes the step 60 of obtaining a result from comparing each image data item received and processed between a start-of-a page signal item and end-of-the page signal item, with the read identifier. In a step 70, the data received for processing is stored in a page size buffer memory, a page at a time. Finally, the method includes a step 75A, 75B of automatically controlling selection and in-process reselection of a copying mode, or selection and in-process reselection of a copy sheet supply unit, responsively to the comparison result obtained.

It is, therefore, apparent that there has been provided in accordance with the present invention, an electronic reprographic machine or printer that can produce high quality cost effective multi-page documents. The reprographic machine or printer operates in a simplex or duplex mode, and includes a plurality of copy sheet supply units each holding a different type sheets, such as coated and uncoated sheets. A control system passes and compares electronic imaging data, and automatically selects operating mode, and copy sheet supply depending on a characteristic of the imaging data. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An in-process control method for automatically controlling an aspect of a printing machine of the type having a microprocessor, a raster image processor and a raster image output unit for printing various types of images in segments, the in-process control method comprising the steps of:

(a) reading a prestored identifier for a type of image data items to be used as a basis for controlling the aspect of the machine;

(b) receiving and processing electronic imaging data items including image data items and segment control data items;

(c) identifying for each segment to be printed, a start-of-the segment control data item, and an end-of-said segment control data item;

(d) comparing each image data item received and processed between said start-of-a segment control data item and said end-of-said segment control data item with said read prestored identifier and obtaining a result of such comparison; and (e) automatically controlling said aspect of the machine responsively to the result of said comparing step.

2. The in-process control method of claim 1, including a step of processing and temporarily storing said received image data items in a buffer memory for transfer to said image output unit of the machine.

3. The in-process control method of claim 2, wherein said processing and storing step comprises storing said processed image data items in a page size buffer memory.

4. The in-process control method of claim 1, wherein said imaging data items receiving step includes receiving page control data items.

5. The in-process control method of claim 1, wherein said identifying step comprises identifying a start-of-a page control data item and an end-of-said page control data item.

6. The in-process control method of claim 1, wherein said reading step comprises reading an identifier for one color type of image data items.

7. The in-process control method of claim 1, wherein said reading step comprises reading a prestored identifier for multiple colored type of image data items.

8. The in-process control method of claim 1, wherein the printing machine includes a plurality of copy sheet supply units for holding and supplying various types of copy sheets, and said automatic controlling step includes automatically selecting a copy sheet supply unit from said plurality of copy sheet supply units.

9. The in-process control method of claim 8, wherein said reading step comprises reading a prestored identifier for multicolored type of image data items, and said automatic controlling step comprises automatically selecting a copy sheet supply unit supplying plain paper copy sheets when no multicolored types of image data items are received between a start-of-a page and an end-of-said page control data items.

10. The in-process control method of claim 8, wherein said reading step comprises reading a prestored identifier for multicolored types of image data items, and said automatic controlling step comprises automatically selecting a copy sheet supply unit supplying coated paper copy sheets when multicolored types of image data items are received between a start-of-a page and an end-of-said page control data items.

11. The in-process control method of claim 8, wherein said reading step comprises reading a prestored identifier for multicolored types of image data items, and said automatic controlling step comprises automatically selecting a copy sheet supply unit supplying glossy finish copy sheets when multicolored types of image data items are received between a start-of-a page and end-of-said page control data items.

12. The in-process control method of claim 8, wherein said reading step comprises reading a prestored identifier for multicolored types of image data items, and said automatic controlling step comprises automatically selecting a copy sheet supply unit supplying matte finish copy sheets when no multicolored types of image data items are received between a start-of-a page and an end-of-said page control data items.

13. The in-process control method of claim 1, wherein the printing machine includes simplex and duplex copying modes, and said automatic controlling step includes automatically changing the copying mode between said simplex and said duplex modes.

14. The in-process control method of claim 13, wherein said reading step comprises reading a prestored identifier for multicolor types of image data items, and said automatic controlling step comprises automatically changing the copying mode from a duplex copying to a simplex copying mode when multicolored types of image data items are received between a start-of-a page and an end-of-said page control data items.

15. A printing machine comprising:

(a) an image receiving member;

(b) a raster image output unit for outputting an image of an original in segments onto said image receiving member;

(c) means for effecting a controllable aspect of the printing machine, said controllable aspect having at least first and second states; and (d) an electronic control subsystem for controlling the printing machine, the control subsystem comprising:

(i) a unit for receiving imaging data items including image data items and segment control data items for processing;

(ii) a unit for reading a prestored identifier for a type of image data items to be used as a basis for selecting between said at least first and second states of said controllable aspect;

(iii) a comparing unit for obtaining a result from comparing with said prestored identifier, types of image data items received and processed between a start-of a segment control data item and an end-of said segment control data item; and (iv) a unit for automatically selecting one of said first and said second states of said controllable aspect of the machine depending on the result of the comparing unit.

16. The printing machine of claim 15, wherein said image receiving member includes a charged photoreceptor; and said raster image output unit includes a raster output scanner (ROS) for writing on said charged photoreceptor.

17. The printing machine of claim 15, wherein said image receiving member includes an image receiving sheet; and said raster image output unit includes a printhead for printing on said image receiving sheet.

18. The printing machine of claim 15, further comprising a plurality of sheet supply units for holding and supply various types of sheets, and said controllable aspect comprises selection of one of said sheet supply units.

19. The printing machine of claim 18, wherein said plurality of sheet supply units includes a first unit for supplying plain sheets, and a second unit for supplying coated sheets.

20. The printing machine of claim 18, wherein said plurality of sheet supply units includes a first unit for supplying matte finish sheets, and a second unit for supplying glossy finish sheets.

21. The printing machine of claim 18, wherein said plurality of sheet supply units includes a first unit for supplying virgin paper sheets, and a second unit for supplying recycled paper sheets.

22. The printing machine of claim 18, wherein said control subsystem includes a page size buffer memory for storing processed imaging data items.

23. The printing machine of claim 15 wherein the machine includes simplex and duplex modes, and the controllable aspect of the machine comprises selection of one of said simplex and said duplex modes.

* * * * *